Sept. 27, 1932.   R. L. JENNER   1,879,282
SUSPENSION CLAMP
Filed July 29, 1930
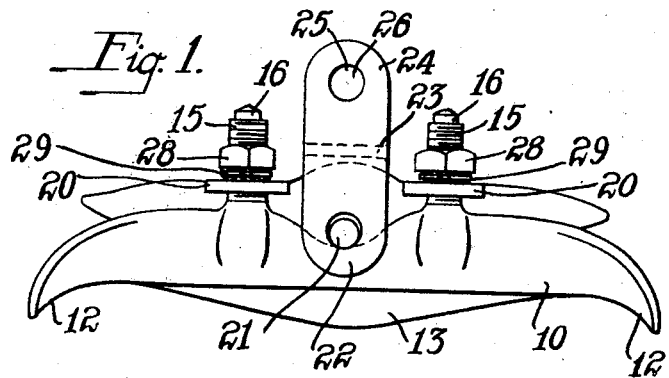
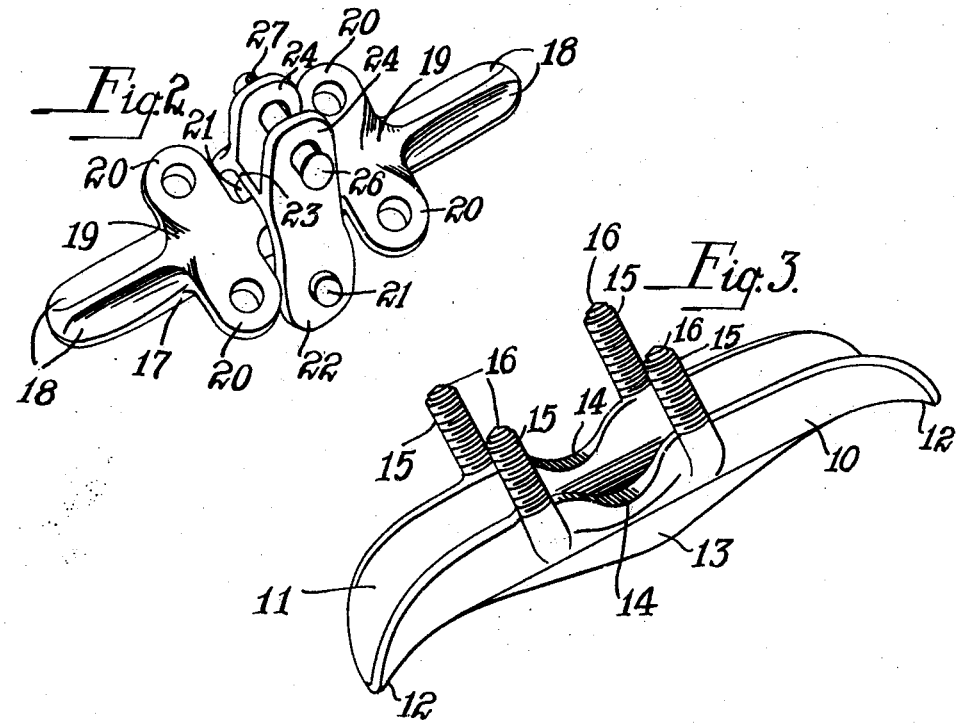
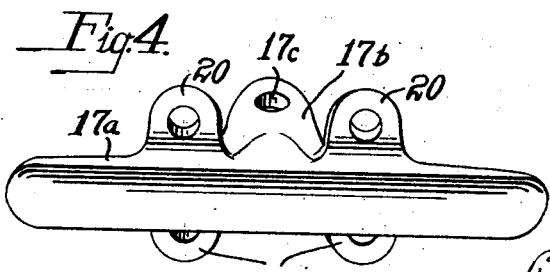
INVENTOR
Ralph L. Jenner
By Green & McCallister
His Attorneys Patented Sept. 27, 1932

1,879,282

UNITED STATES PATENT OFFICE

RALPH L. JENNER, OF EAST ORANGE, NEW JERSEY, ASSIGNOR TO LAPP INSULATOR COMPANY, INC., A CORPORATION OF NEW YORK

SUSPENSION CLAMP

Application filed July 29, 1930. Serial No. 471,556.

This invention relates to suspension clamps and provides a suspension clamp for the reception of a cable, wire or other tension member to be supported non-rigidly.

Suspension clamps have heretofore been attached in such a manner as to have partial rigidity with the result that undue strain is placed upon the cable or wire thus shortening its life and/or causes it to break partly or wholly. It is desirable that such a clamp be mounted so as to yield quickly and without imposing forces or stresses in the cable, wire, conductor, tension member, or the like.

One of the objects of the present invention is to provide a suspension clamp which can yield to the forces of nature or movements set up in use without imposing stresses in the conductor.

Another object of the invention is the provision of a suspension clamp having in effect only two members so assembled as to provide a construction having maximum strength with minimum weight and also having greater ease of assembly.

A further object is to provide for the reduction of rotational inertia or polar movement of inertia of the clamp in a vertical plane about its center of instantaneous oscillation thus lessening vibrational stress and/or distortion of the conductor or tension member.

A still further object is the provision of clamping and bolting members made of unitary forgings.

Other and further objects of the invention will either be understood by those skilled in this particular art or will be hereinafter apparent or pointed out.

In the accompanying drawing:

Figure 1 illustrates a side elevation of one form of the present invention.

Fig. 2 is a perspective view of the keeper member.

Fig. 3 is a perspective view of the guide member; and

Fig. 4 is a perspective view of a modified form of keeper.

Referring in detail to the drawing, I have provided a body member 10 having a central longitudinal groove 11, the body member being downwardly curved at each end as shown at 12 to form a cradle or seat for the cable or tension member to be placed therein. The body member is also provided with a reinforcing rib 13 on its under surface so as to provide maximum strength for a minimum of material and about midway of the body member are the circular depressions or cutaway portions 14 for a purpose hereinafter apparent. Rising from the side walls of the body member and unitary therewith are the upwardly extending exteriorly threaded bolts 15, having the guide tips 16 at their ends.

The keeper member has a relatively long and narrow body portion 17, the width of which is approximately equal to the groove 11 of the body member 10 and the portions 18 are cut away to make the keeper light, and at the same time the portions 19 are strengthened and extending laterally therefrom are the apertured ears 20 so arranged that each apertured ear receives one of the exteriorly threaded bolts 15 hereinabove referred to. Extending laterally from the midportion of the keeper are the trunnions 21, which do not contact with the depressions 14.

Irremovably sprung over said trunnions are the arms 22 of the yoke 23, the arrangement being such that the minimum distance between the outer ends of the trunnions is greater than the minimum distance between the portions of the arms through which they pass. In effect, therefore, a one-piece construction is obtained. The upper end of the yoke is bifurcated to provide the ears 24 which are apertured at 25 for the reception therethrough of a headed pin 26, the end of which opposite the head having an aperture therethrough for the reception of a cotter pin 27. It is clear that the clamp is suspended by means of these last named parts from any suitable support which may be a string of insulators or the like. A socket may be substituted for the bifurcated upper end of the yoke as disclosed in my copending application Serial No. 471,555, filed July 29 1930.

Nuts 28 are provided for securing the body and keeper members together and if desired a locking arrangement may be used wherein the upper surface of the apertured ears 20 may be serrated as may likewise be the lower surfaces of the nuts 28, a washer 29 being placed between each ear and nut whereby a non-disengageable connection is made, which can, however, be removed in case of necessity by the application of considerable force to the nuts in which case the serrations of the nuts usually give away, but new nuts can be substituted therefor when ready to make a new engagement. The washer may, however, give way also.

The keeper above mentioned may be modified by omitting the trunnions and yoke and extending the central portion of the keeper body 17$^a$ upwardly as at 17$^b$ which is provided with a transverse hole 17$^c$ by means of which the clamp may be suspended in an analogous manner.

It will be clear that an added advantage is offered by this construction because it is usual to place the cable or tension member in the clamp before the parts are assembled and, by means of the above construction, it will be seen that the keeper member is at all times hanging from the support so that it is only necessary for the linesman or operator with one hand to push the body member up against the guy or tension member so as to receive it therein and then to push the body and cable up against the keeper member so that the bolts 15 pass readily through the apertured ears 20 and with his other hand he can then thread the nuts readily on the bolts.

The members may all be made of unitary forgings providing maximum strength with minimum size and weight. This has the effect of reducing the rotational inertia of the clamping means about the center of instantaneous oscillation. The inertia acts as a distorting force on the conductor or tension member producing vibrational stress when it oscillates in a vertical plane due to the wind blowing on the wire.

What I claim as new and desire to secure by Letters Patent is:

1. A suspension clamp consisting of a grooved body member, and upstanding unitary bolts, an oppositely grooved keeper member having apertured ears for the reception of said bolts, said keeper also having laterally extending trunnions and a yoke member irremovably sprung over said trunnions.

2. A suspension clamp consisting of a grooved body member, and upstanding unitary bolts, an oppositely grooved keeper member having apertured ears for the reception of said bolts, said keeper also having laterally extending trunnions and a yoke member irremovably sprung over said trunnions, the minimum distance between the outer ends of said trunnions being greater than the minimum distance between the arms of the yoke through which said trunnions pass.

3. A suspension clamp consisting of a grooved body member, having unitary upstanding bolts, an oppositely grooved keeper member having unitary, projecting apertured ears for the reception of said bolts, said keeper also having laterally extending unitary trunnions and a yoke member irremovably sprung over said trunnions, said body member having a reinforcing rib and intermediate side wall depressions.

4. A suspension clamp composed of a body member and a keeped member, said body being grooved, having medial side-wall depressions, and an upstanding bolt extending from each end of each depression, said keeper member being grooved oppositely to said grooved body member, having metal cut away from the upper surfaces at the ends thereof except for medial ribs, sets of spaced apertured ears extending laterally from said keeper member and merging with said ribs and cut away portions, said ears being spaced to register with the bolts aforesaid, and irremovable suspending means extending from said keeper member from between said sets of ears.

In testimony whereof, I have hereunto subscribed my name this 25th day of July, 1930.

RALPH L. JENNER.